(12) United States Patent
Lin et al.

(10) Patent No.: US 9,132,684 B2
(45) Date of Patent: Sep. 15, 2015

(54) LIGHT GUIDE PLATE AND MANUFACTURING METHOD THEREOF

(75) Inventors: Jen-Shun Lin, Miaoli County (TW); Bai-Chen Chang, Miaoli County (TW); Kun-Chih Pan, Miaoli County (TW)

(73) Assignee: DARWIN PRECISIONS CORPORATION, Taichung (TW)

( * ) Notice: Subject to any disclaimer, the term of this patent is extended or adjusted under 35 U.S.C. 154(b) by 730 days.

(21) Appl. No.: 13/174,030

(22) Filed: Jun. 30, 2011

(65) Prior Publication Data

US 2012/0037016 A1 Feb. 16, 2012

(30) Foreign Application Priority Data

Aug. 16, 2010 (TW) .............................. 99127358 A

(51) Int. Cl.
*F21V 7/04* (2006.01)
*B41M 1/12* (2006.01)

(52) U.S. Cl.
CPC ...................................... *B41M 1/12* (2013.01)

(58) Field of Classification Search
CPC ........................................................ B41M 1/12
USPC ......................................................... 362/615
See application file for complete search history.

(56) References Cited

U.S. PATENT DOCUMENTS

| 8,408,775 B1* | 4/2013 | Coleman ........................ 362/615 |
| 2004/0004668 A1* | 1/2004 | Namazue et al. ............. 348/340 |
| 2006/0066945 A1* | 3/2006 | Yeo et al. ...................... 359/457 |
| 2008/0192484 A1* | 8/2008 | Lee et al. ...................... 362/327 |
| 2009/0323313 A1 | 12/2009 | Choi |
| 2013/0114267 A1* | 5/2013 | Ho et al. ....................... 362/306 |

FOREIGN PATENT DOCUMENTS

| TW | 493148 | 7/2002 |
| TW | I274654 | 3/2007 |
| TW | I280943 | 5/2007 |
| TW | I292843 | 1/2008 |
| TW | 200821631 | 5/2008 |
| TW | I307421 | 3/2009 |
| TW | 201009437 | 3/2010 |
| TW | 201022048 | 6/2010 |

* cited by examiner

*Primary Examiner* — Anh Mai
*Assistant Examiner* — Hana Featherly
(74) *Attorney, Agent, or Firm* — Muncy, Geissler, Olds & Lowe, P.C.

(57) ABSTRACT

A light guide plate and a manufacturing method thereof are disclosed. The light guide plate includes a substrate, a screen-printed layer, and a light-solidified layer. The substrate has a first surface and a second surface, and the first surface and the second surface are opposite. The screen-printed layer is formed on the first surface of the substrate by a screen-printing process. The light-solidified layer is formed on the second surface of the substrate by a light-solidification and imprinting process. The screen-printed layer has a plurality of screen point patterns. The light-solidified layer has a plurality of micro-structures.

6 Claims, 9 Drawing Sheets

LIGHT GUIDE PLATE AND
MANUFACTURING METHOD THEREOF

BACKGROUND OF THE INVENTION

1. Field of the Invention

The invention relates to a light guide plate, in particular, to a light guide plate having a two-side composite structure and a manufacturing method thereof combining a screen-printing process and a light-solidification and imprinting process to achieve the advantages of thinning, high transfer ratio, automatic production, and no limitations to production point size.

2. Description of the Prior Art

Among the components of a backlight module, the light guide plate is a key light guide medium applied in the edge type backlight module to guide the direction of light to enhance the brightness of the panel and control the uniformity of the lightness. The appearance of light guide plate can be a wedge type or a flat type. The wedge type light guide plate is usually used in notebook due to the space issue, and the flat type light guide plate is used in LCD monitor and LCD television.

In general, the light guide plate is usually manufactured by an injection molding method, a thermal compression molding method, or a printing method. However, with the increasing of the size of the panel and the requirement of panel thinning, the injection molding method, the thermal compression molding method and the printing method fail to solve many problems respectively as follows.

(1) The problems of the injection molding method includes: (a) the size of the light guide plate is limited, so that the maximum size of the light guide plate practically manufactured is about 32 inch; (b) the thickness of the light guide plate is limited to 2 mm; and (c) the manufacturing cost is higher.

(2) The problems of the thermal compression molding method includes: (a) the transfer ratio of the light guide plate structure is only 70%, and it is too low; and (b) the manufacturing cost is higher.

(3) The problems of the printing method includes: (a) the printing point size will be shifted with the increasing of the number of the manufactured light guide plates, and the point spreading ratio is about 20~40%; and (b) the printing method fails to provide geometric structures, and only polygon structure and point structure can be manufactured.

SUMMARY OF THE INVENTION

Therefore, a scope of the invention is to provide a light guide plate and manufacturing method thereof to solve the above-mentioned problems occurred in the prior arts.

An embodiment of the invention is a light guide plate. In this embodiment, the light guide plate includes a substrate, a first screen-printed layer, and a light-solidified layer. The substrate has a first surface and a second surface, and the first surface and the second surface are opposite. The first screen-printed layer is formed on the first surface of the substrate by a screen-printing process. The light-solidified layer is formed on the second surface of the substrate by a light-solidification and imprinting process. The first screen-printed layer has a plurality of screen point patterns. The light-solidified layer has a plurality of micro-structures.

In practical applications, a material of the substrate is selected from one of a group formed by Polymethylmethacrylate (PMMA), Polycarbonate (PC), Polyethylene Terephthalate (PET), Acrylonitrile-Butadiene-Styrene (ABS), Polystyrene (PS), and Methyl-methacrylate-Styrene (MS). The plurality of micro-structures is selected from one of a group formed by a circle micro-structure, a V-shape groove micro-structure, a pyramid micro-structure, a lens micro-structure, a prism brightness enhancement film (BEF) micro-structure, a fly-cut micro-structure, a fast tool servo (FTS) micro-structure, and a lattice micro-structure.

During the screen-printing process, a screen-printing plate can be used to transfer an ink onto the first surface of the substrate, and then the ink can be thermally cured to form the first screen-printed layer. During the light-solidification and imprinting process, a rolling device can be used to roll the substrate to make a light-solidified resin coated on the second surface of the substrate fit with a mold corresponding to the plurality of micro-structures, and then a UV lamp can be used to irradiate and solidify the light-solidified resin to form the light-solidified layer and the plurality of micro-structures. In fact, the rolling device can be constituted by an elastic material, the force that the rolling device rolls the substrate ranges from 5 Kg to 8 Kg.

In an embodiment, the light guide plate further includes a second screen-printed layer. The screen-printed layer can be formed on the light-solidified layer by the screen-printing process.

Another embodiment of the invention is a light guide plate manufacturing method. In this embodiment, the light guide plate manufacturing method includes steps of: preparing a substrate having a first surface and a second surface, wherein the first surface and the second surface are opposite; using a screen-printing process to form a first screen-printed layer on the first surface of the substrate, wherein the first screen-printed layer has a plurality of screen point patterns; using a light-solidification and imprinting process to form a light-solidified layer on the second surface of the substrate, wherein the light-solidified layer has a plurality of micro-structures.

In an embodiment, the first screen-printed layer forming step can include steps of: using a screen-printing plate to transfer an ink onto the first surface of the substrate; thermally curing the ink to form the first screen-printed layer.

In an embodiment, the step of forming the light-solidified layer having the plurality of micro-structure can further include steps of: coating a light-solidified resin on the second surface of the substrate; rolling the substrate to make the light-solidified resin coated on the second surface fit with a mold corresponding to the plurality of micro-structures; irradiating UV to the light-solidified resin to form the light-solidified layer having the plurality of micro-structures.

In an embodiment, after the step of forming the light-solidified layer having the plurality of micro-structure is finished, the method can further include s step of using the screen-printing process to form a second screen-printed layer on the light-solidified layer.

In practical applications, if the method forms the light-solidified layer having the plurality of micro-structure on the second surface of the substrate firstly, then the method can form a protection film on the light-solidified layer having the plurality of micro-structures to protect the plurality of micro-structures before forming the first screen-printed layer on the first surface of the substrate.

Compared to prior arts, the light guide plate having a two-side composite structure and the manufacturing method of the invention combines a screen-printing process and a light-solidification and imprinting process to achieve the advantages of thinning, high transfer ratio, automatic production, and no limitations to production point size. Therefore, the production of the light guide plate can be effectively enhanced to increase the competitiveness of the light guide plate in the market. In addition, the two sides of the light guide plate of the invention can have different composite structures respectively; therefore, it can be specially designed to distribute the light emitting geometry in a zoning way, and a way of stacking light guide plates can be also used to control a single region of the panel to emit light.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a light guide plate. In this embodiment, the light guide plate has a two-side composite structure, but not limited by this case. In fact, the light guide plate is a key light guide medium applied in an edge type backlight module of a LCD apparatus to guide the direction of light to enhance the brightness of the panel and control the uniformity of the lightness.

Figure 1:
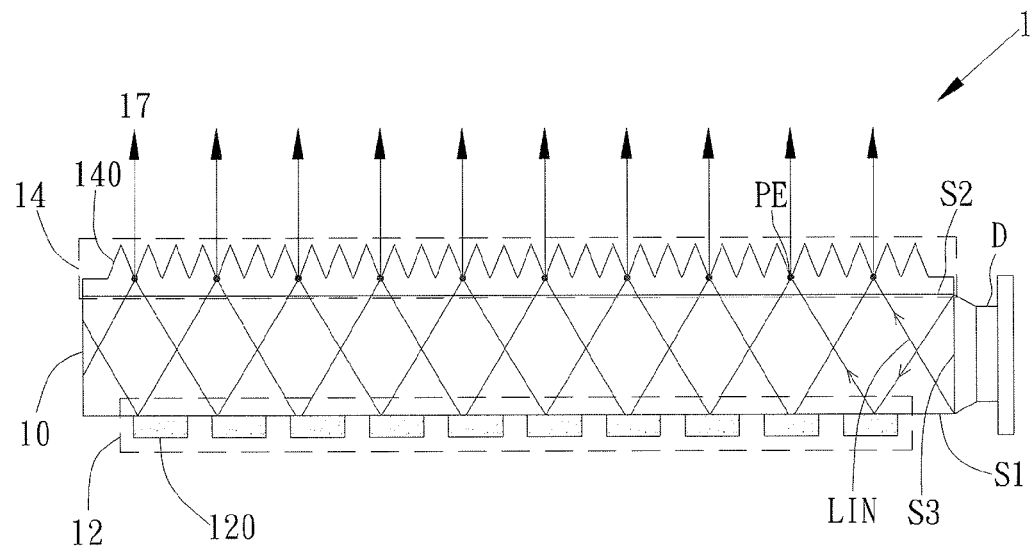
FIG. 1 illustrates a side schematic diagram of the light guide plate structure in a preferred embodiment of the invention.

Please refer to FIG. 1. FIG. 1 illustrates a side schematic diagram of the light guide plate structure applied in the edge type backlight module of the LCD apparatus in this embodiment. As shown in FIG. 1, the light guide plate 1 includes a substrate 10, a first screen-printed layer 12, and a light-solidified layer 14. The substrate 10 has a first surface S1 and a second surface S2, and the first surface S1 and the second surface S2 are opposite. The first screen-printed layer 12 is formed on the first surface S1 of the substrate 10 by a screen-printing process. The light-solidified layer 14 is formed on the second surface S2 of the substrate 10 by a light-solidification and imprinting process. It should be noticed that the first screen-printed layer 12 has a plurality of screen point patterns 120, and the light-solidified layer 14 has a plurality of micro-structures 140. There may be a certain corresponding relationship existed between the plurality of screen point patterns 120 and the plurality of micro-structures 140, for example, a micro-structure 140 corresponds to several screen point patterns 120, but not limited to this case.

As shown in FIG. 1, the first surface S1 of the substrate 10 forming the first screen-printed layer 12 is a light reflection surface, and the second surface S2 of the substrate 10 forming the light-solidified layer 14 is a light emitting surface. The lights emitted from the light-emitting diode (LED) D of the edge type backlight module will be transmitted in the substrate 10 through a reflection method, and emitted from the micro-structure 140 of the light-solidified layer 14 on the second surface S2 of the substrate 10, as the light 17 shown in FIG. 1. The substrate 10 further has a third surface S3 adjacent to the first surface S1 and the second surface S2. An incident light LIN is emitted into the substrate 10 through the third surface S3 and then the incident light LIN is transmitted in the substrate 10. The plurality of screen point patterns 120 of the first screen-printed layer 12 is directly disposed on the first surface S1 of the substrate 10 to reflect the incident light LIN transmitted in the substrate 10 toward the second surface S2. An emitting point PE is disposed between two micro-structures 140 of the light-solidified layer 14 to emit the incident light LIN reflected toward the second surface S2 out of the light guide plate 1, as the light 17 vertical to the second surface S2.

In practical applications, the substrate 10 used in the light guide plate 1 is preferably a plastic substrate. For example, the material of the substrate 10 can be a plastic material, such as Polymethylmethacrylate (PMMA), Polycarbonate (PC), Polyethylene Terephthalate (PET), Acrylonitrile-Butadiene-Styrene (ABS), Polystyrene (PS), or Methyl-methacrylate-Styrene (MS), but not limited to this case.

Figure 2:
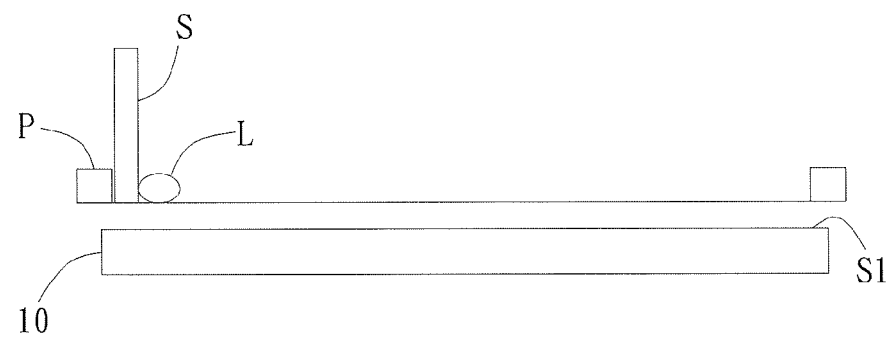
FIG. 2 illustrates a side schematic diagram of forming the first screen-printed layer on the first surface of the substrate.
Figure 3:
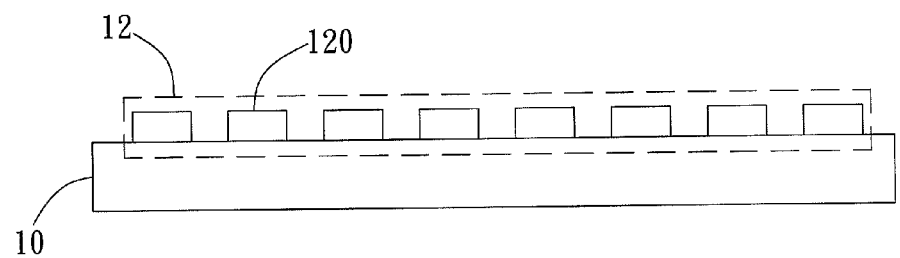
FIG. 3 illustrates a side schematic diagram of the first screen-printed layer having a plurality of screen point patterns.

Please refer to FIG. 2. FIG. 2 illustrates a side schematic diagram of forming the first screen-printed layer 12 on the first surface S1 of the substrate 10. As shown in FIG. 2, a screen-printing plate P is disposed above the substrate 10, and an ink L is injected at one side of the screen-printing plate P, and then a scraper S is used to roll the ink L to fill the mask opening of the screen-printing plate P. Then, the screen-printing plate P is be moved away from the first surface S1 of the substrate 10. At this time, screen point patterns have been transferred onto the first surface S1 of the substrate 10 through the ink L. Afterward, the ink L is heated to form the first screen-printed layer 12 having the plurality of screen point patterns 120, as shown in FIG. 3.

Figure 4:
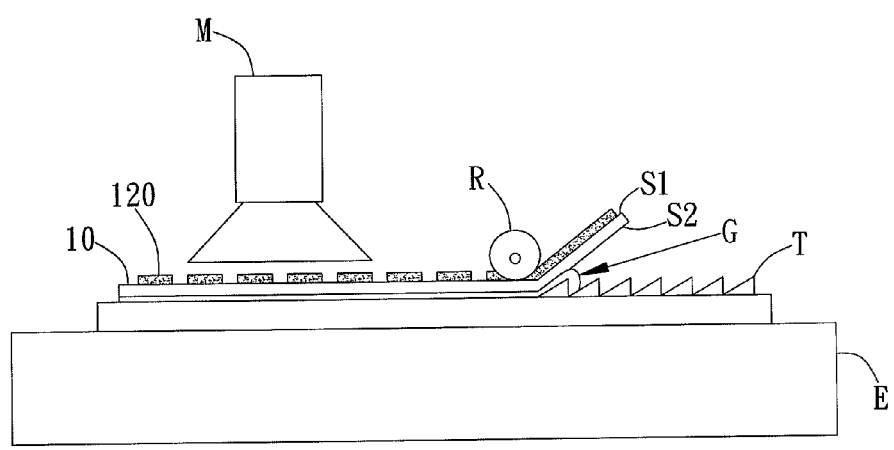
FIG. 4 illustrates a schematic diagram of forming the light-solidified layer on the second surface of the substrate.

Please refer to FIG. 4. FIG. 4 illustrates a schematic diagram of forming the light-solidified layer 14 on the second surface S2 of the substrate 10. As shown in FIG. 4, a light-solidified resin G (e.g., a UV glue) is coated on the second surface S2 of the substrate 10, and then a rolling device R is used to roll the substrate 10 to make the light-solidified resin G coated on the second surface S2 of the substrate 10 fit with a mold T corresponding to the plurality of micro-structures 140. Then, a UV lamp M is used to irradiate and solidify the light-solidified resin G to form the light-solidified layer 14 having the plurality of micro-structures 140.

Figure 5A:
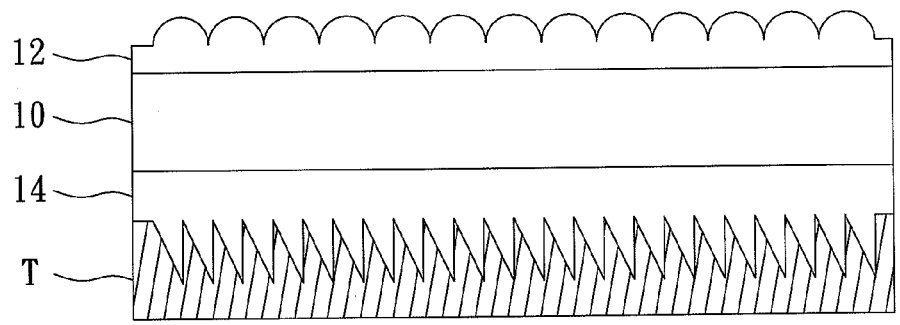
FIG. 5A illustrates the mold of the fast tool servo (FTS) type.
Figure 5B:
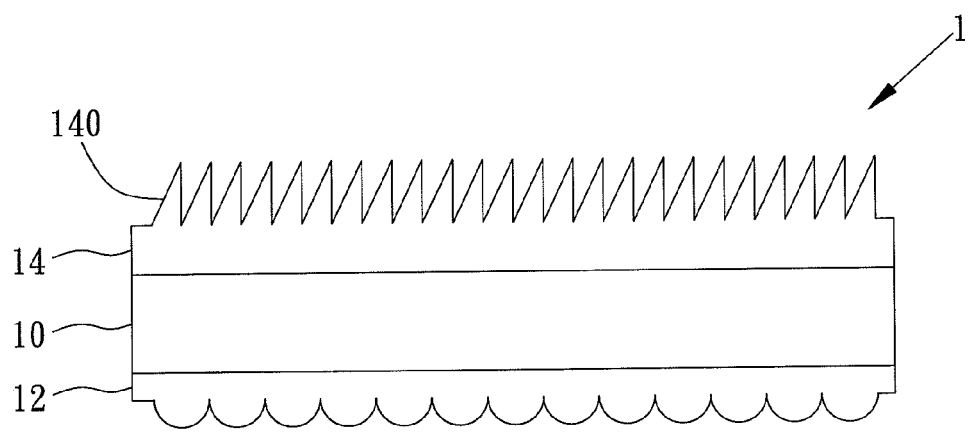
FIG. 5B illustrates the FTS micro-structure on the light-solidified layer.

It should be noticed that the rolling device R is constituted by an elastic material, and the force that the rolling device R rolls the substrate 10 ranges from 5 Kg to 8 Kg, but not limited to this case. The type of the micro-structures 140 formed on the light-solidified layer 14 relates to the mold T used in the light-solidification and imprinting process. Please refer to FIG. 5A and FIG. 5B, the mold T shown in FIG. 5A belongs to the type of FTS, therefore, the micro-structures 140 formed on the light-solidified layer 14 through the light-solidification and imprinting process will be the FTS micro-structures, as shown in FIG. 5B.

Figure 5C:
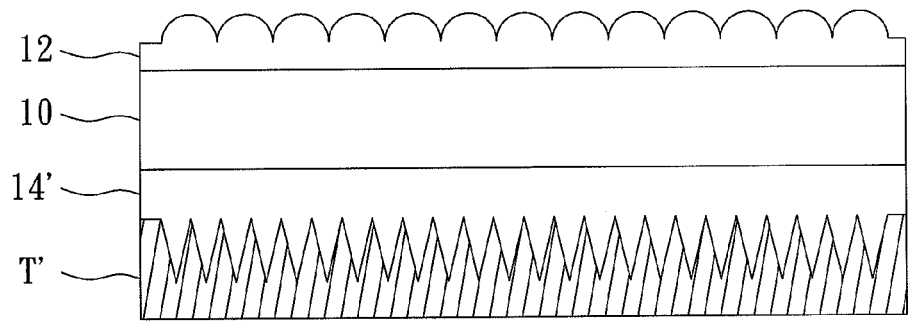
FIG. 5C illustrates the mold of the prism brightness enhancement film (BEF) type.
Figure 5D:
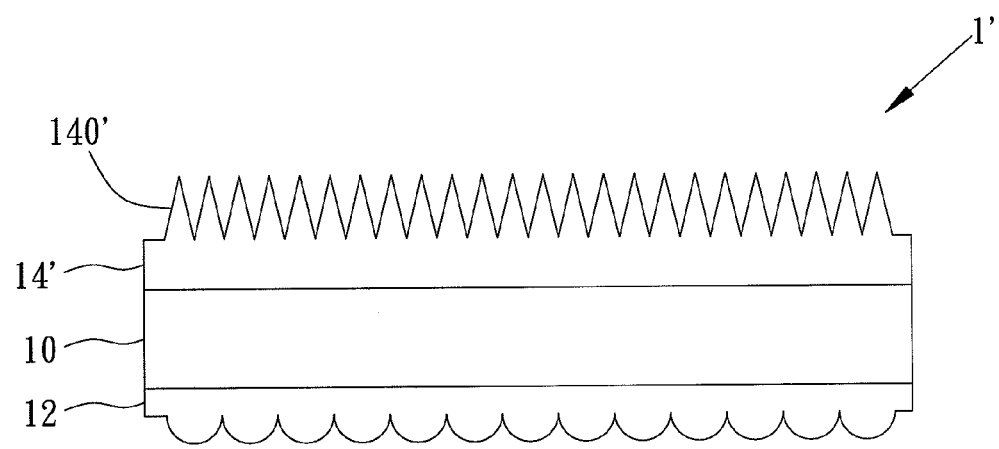
FIG. 5D illustrates the BEF micro-structure on the light-solidified layer.

Similarly, please refer to FIG. 5C and FIG. 5D, the mold T' shown in FIG. 5C belongs to the type of BEF, therefore, the micro-structures 140' formed on the light-solidified layer 14' through the light-solidification and imprinting process will be the prism BEF micro-structures, as shown in FIG. 5D. In fact, except the above-mentioned FTS micro-structures and the prism BEF micro-structures, the micro-structures formed on the light-solidified layer can be a circle micro-structure, a V-shape groove micro-structure, a pyramid micro-structure, a lens micro-structure, a fly-cut micro-structure, a lattice micro-structure, or any other types of micro-structure without any limitations.

Figure 6:
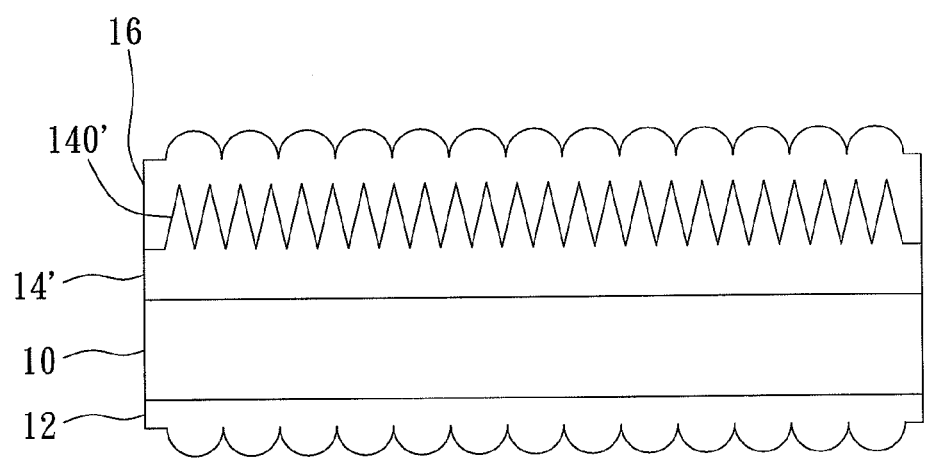
FIG. 6 illustrates a schematic diagram of further forming the second screen-printed layer on the light-solidified layer.

Except the light guide plate having the screen-printed layer and the light-solidified layer on two sides respectively, in practical applications, the structures on two sides of the light guide plate are not limited by the above-mentioned embodiments. For example, as shown in FIG. 6, the light guide plate 1 can further include a second screen-printed layer 16 having a plurality of screen point patterns. The second screen-printed layer 16 is formed on the light-solidified layer 14' through the screen-printing process to manufacture the light guide plate having the composite structure which has the first screen-printed layer 12 at one side and the light-solidified layer 14' and the second screen-printed layer 16 on another side. Even more complicated composite structures can be also formed at two side of the light guide plate based on practical needs without any limitations.

Figure 7:
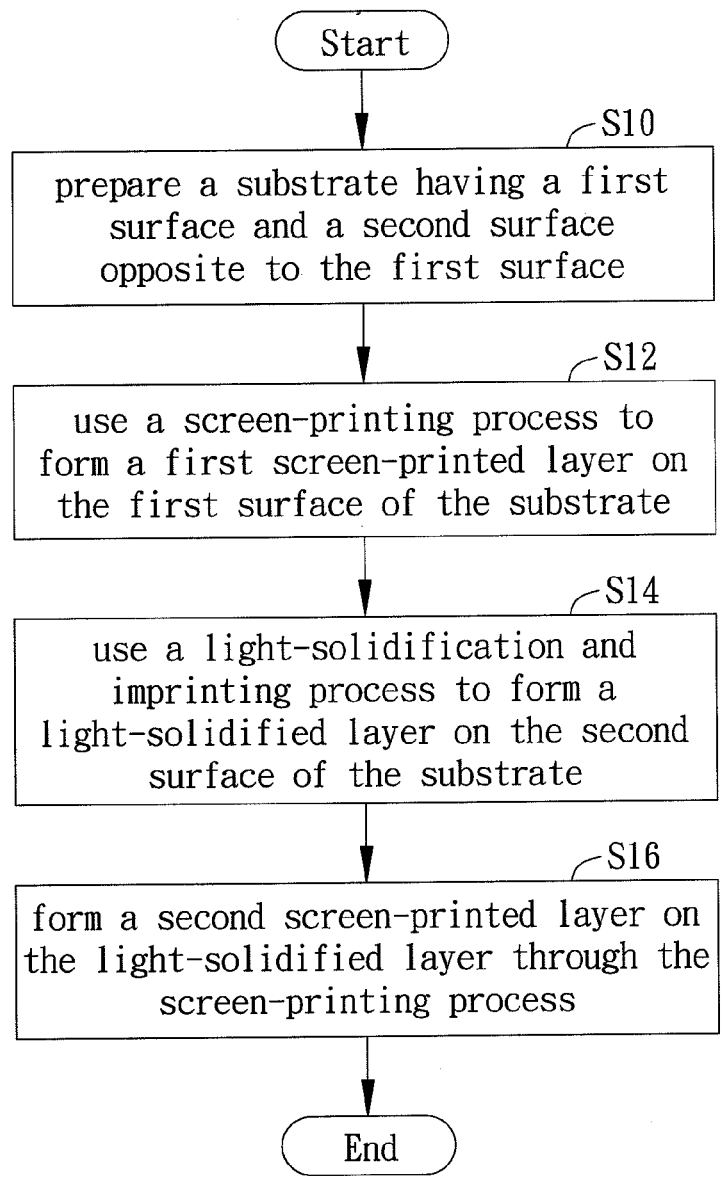
FIG. 7 illustrates a flowchart of the light guide plate manufacturing method in another embodiment of the invention.

Another embodiment of the invention is a light guide plate manufacturing method. Please refer to FIG. 7. FIG. 7 illustrates a flowchart of the light guide plate manufacturing method in this embodiment. As shown in FIG. 7, at first, the method performs a step S10 to prepare a substrate having a first surface and a second surface opposite to the first surface. Preferably, the substrate is a plastic substrate, but not limited to this case.

In practical applications, the material of the substrate can be Polymethylmethacrylate (PMMA), Polycarbonate (PC), Polyethylene Terephthalate (PET), Acrylonitrile-Butadiene-Styrene (ABS), Polystyrene (PS), or Methyl-methacrylate-Styrene (MS), but not limited to these cases.

Figure 8:
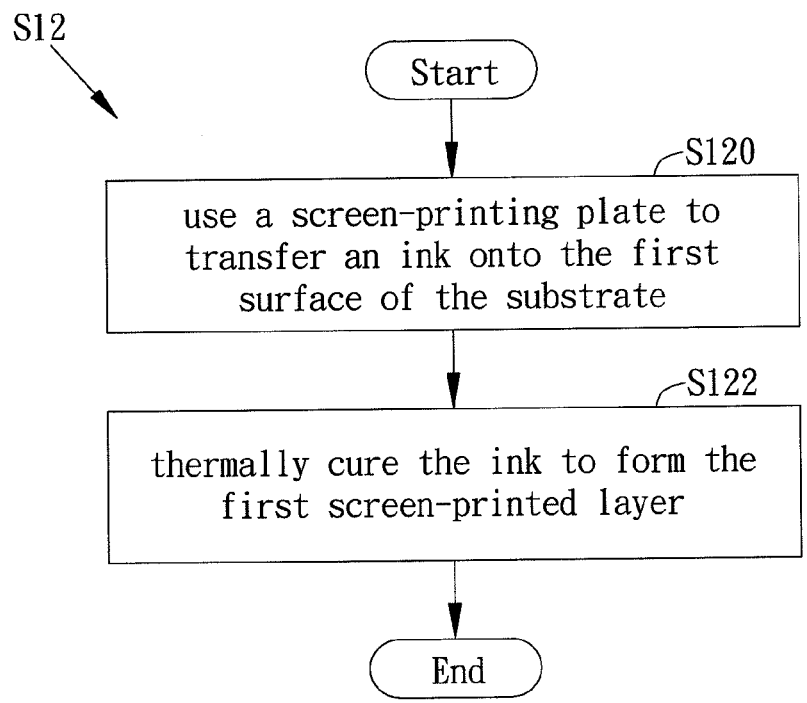
FIG. 8 illustrates a detail flowchart of the step S12 in FIG. 7.
Figure 9:
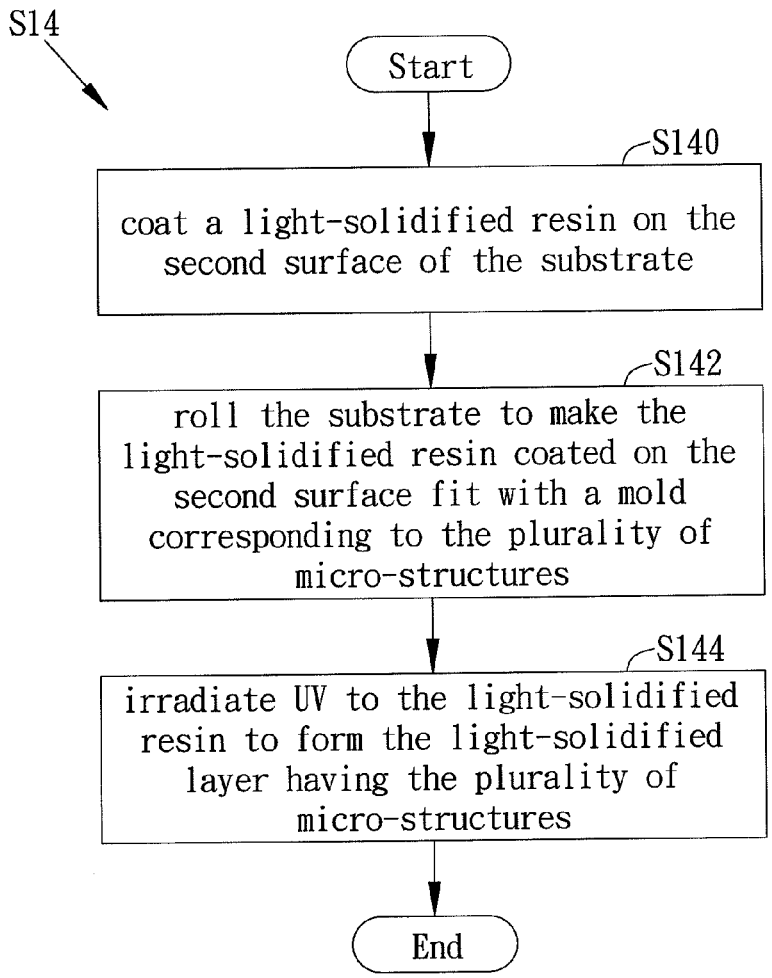
FIG. 9 illustrates a detail flowchart of the step S14 in FIG. 7.

Then, the method performs a step S12 to use a screen-printing process to form a first screen-printed layer on the first surface of the substrate. In fact, during the screen-printing process, the thermally cured ink is used as the screen-printing material. Please refer to FIG. 8. The step S12 can be further divided into two sub-steps S120 and S122, wherein the sub-step S120 is to use a screen-printing plate to transfer an ink onto the first surface of the substrate; the sub-step S122 is to thermally cure the ink to form the first screen-printed layer.

In the sub-step S120, the method injects the ink at one side of the screen-printing plate, and then uses a scraper to roll the ink to fill the mask opening of the screen-printing plate. Then, the method moves the screen-printing plate away from the first surface of the substrate, and the ink of the screen point patterns have been transferred onto the first surface of the substrate. Afterward, the method performs the sub-step S122 to heat the ink to form the first screen-printed layer.

Afterward, back to FIG. 7, the method performs a step S14 to use a light-solidification and imprinting process to form a light-solidified layer on the second surface of the substrate. Please refer to FIG. 11. The step S14 can be further divided into two sub-steps S140 and S144, wherein the sub-step S140 is to coat a light-solidified resin on the second surface of the substrate; the sub-step S142 is to roll the substrate to make the light-solidified resin coated on the second surface fit with a mold corresponding to the plurality of micro-structures; the sub-step S144 is to irradiate UV to the light-solidified resin to form the light-solidified layer having the plurality of micro-structures.

With the above-mentioned steps, the method can manufacture the light guide plate having the screen-printed layer and the light-solidified layer at two sides respectively. In addition, the method can also perform the steps S12 and S14 at the same time, that is to say, the method can form the first screen-printed layer and the light-solidified layer having the plurality of micro-structures on the first surface and the second surface of the substrate respectively through the screen-printing process and the light-solidification and imprinting process at the same time.

In practical applications, the structures on two sides of the light guide plate are not limited by the above-mentioned embodiments. For example, as shown in FIG. 7, the method can further perform a step S16 to form a second screen-printed layer on the light-solidified layer through the screen-printing process to manufacture the light guide plate having the composite structure which has the first screen-printed layer at one side and the light-solidified layer and the second screen-printed layer on another side. Even more complicated composite structures can be also formed by the method at two side of the light guide plate based on practical needs without any limitations.

Figure 10:
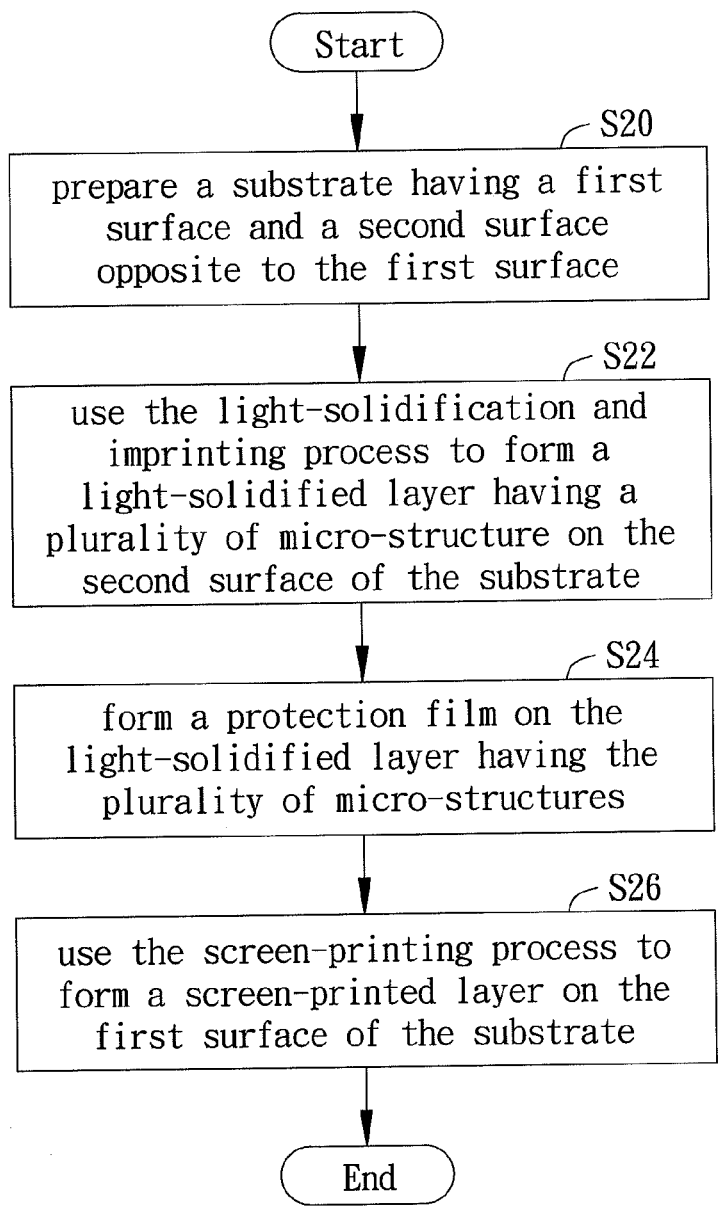
FIG. 10 illustrates a flowchart of the light guide plate manufacturing method in another embodiment of the invention.

In another embodiment, the method can also firstly form the light-solidified layer at one side of the substrate, and then form the screen-printed layer at another side of the substrate. Please refer to FIG. 10. At first, the method performs a step S20 to prepare a substrate having a first surface and a second surface opposite to the first surface. Then, the method perform a step S22 to use the light-solidification and imprinting process to form a light-solidified layer having a plurality of micro-structure on the second surface of the substrate.

It should be noticed that in order to prevent the micro-structures formed on the light-solidified layer from being damaged in the following screen-printing process, the method performs a step S24 to form a protection film on the light-solidified layer having the plurality of micro-structures. In fact, the protection film is attached on and covers the light-solidified layer having the plurality of micro-structures formed on the second surface of the substrate. So that when the substrate is upside down to form the screen-printed layer on the first surface of the substrate, the plurality of micro-structures can be protected by the protection film and become damage-free. Afterward, the method performs a step S26 to use the screen-printing process to form a screen-printed layer on the first surface of the substrate.

Compared to prior arts, the light guide plate having a two-side composite structure and the manufacturing method of the invention combines a screen-printing process and a light-solidification and imprinting process to achieve the advantages of thinning, high transfer ratio, automatic production, and no limitations to production point size. Therefore, the production of the light guide plate can be effectively enhanced to increase the competitiveness of the light guide plate in the market. In addition, the two sides of the light guide plate of the invention can have different composite structures respectively; therefore, it can be specially designed to distribute the light emitting geometry in a zoning way, and a way of stacking light guide plates can be also used to control a single region of the panel to emit light.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A light guide plate, cooperated with an edge type backlight module, comprising:
    a substrate having a first surface, a second surface, and a third surface, wherein the first surface and the second surface are opposite, and the third surface is adjacent to the first surface and the second surface, the third surface is disposed facing the edge type backlight module to receive an incident light emitted by the edge type backlight module and then the incident light is transmitted in the substrate;
    a first screen-printed layer formed on the first surface of the substrate by a screen-printing process, wherein the first screen-printed layer has a plurality of screen point patterns, each of the screen point patterns has a reflecting surface directly disposed on the first surface of the substrate to reflect the incident light transmitted in the substrate toward the second surface;
    a light-solidified layer formed on the second surface of the substrate by a light-solidification and imprinting process, wherein the light-solidified layer has a plurality of micro-structures, an emitting point is disposed between two micro-structures of the light-solidified layer to emit the incident light reflected toward the second surface out of the light guide plate; and
    a second screen-printed layer formed on the light-solidified layer by the screen-printing process, wherein
    the second screen-printed layer is directly and seamlessly formed on the micro-structures of the light-solidified layer, and
    the second screen-printed layer has a plurality of screen point pattern for reflecting light and the screen point pattern is arranged in a way that light is transmissible between the screen point patterns.

2. The light guide plate of claim 1, wherein a material of the substrate is selected from one of a group formed by Polymethylmethacrylate (PMMA), Polycarbonate (PC), Polyethylene Terephthalate (PET), Acrylonitrile-Butdiene-Styrene (ABS), Polystyrene (PS), and Methly-methacrylate-Styrene (MS).

3. The light guide plate of claim 1, wherein the plurality of micro-structures is selected from one of a group formed by a circle micro-structure, a V-shape groove micro-structure, a pyramid micro-structure, a lens micro-structure, a prism brightness enhancement film (BEF) micro-structure, a fly-cut micro-structure, a fast tool servo (FTS) micro-structure, and a lattice micro-structure.

4. The light guide plate of claim 1, wherein during the screen-printing process, a screen-printing plate is used to transfer an ink onto the first surface of the substrate, and then the ink is thermally cured to form the first screen-printed layer.

5. The light guide plate of claim 1, wherein during the light-solidification and imprinting process, a rolling device is used to roll the substrate to make a light-solidified resin coated on the second surface of the substrate fit with a mold corresponding to the plurality of micro-structures, and then a UV lamp is used to irradiate and solidify the light-solidified resin to form the light-solidified layer having the plurality of micro-structures.

6. The light guide plate of claim 5, wherein the rolling device is constituted by an elastic material, the force that the rolling device rolls the substrate ranges from 5 Kg to 8 Kg.

* * * * *